United States Patent
Gerlach et al.

(10) Patent No.: US 9,124,473 B2
(45) Date of Patent: Sep. 1, 2015

(54) DELIVERY PERFORMANCE ANALYSIS FOR INTERNET SERVICES

(71) Applicant: AT&T Intellectual Property I, L.P., Atlanta, GA (US)

(72) Inventors: Richard J. Gerlach, Roswell, GA (US); Charles S. Shull, Marietta, GA (US); David Edward Haslam, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 13/950,915

(22) Filed: Jul. 25, 2013

(65) Prior Publication Data

US 2013/0311652 A1    Nov. 21, 2013

Related U.S. Application Data

(63) Continuation of application No. 13/586,513, filed on Aug. 15, 2012, now Pat. No. 8,621,076, which is a continuation of application No. 10/197,964, filed on Jul. 16, 2002, now Pat. No. 8,266,270.

(51) Int. Cl.
*G06F 15/173* (2006.01)
*G06F 15/177* (2006.01)
(Continued)

(52) U.S. Cl.
CPC .......... *H04L 29/08072* (2013.01); *H04L 43/10* (2013.01); *H04L 43/50* (2013.01); *H04L 67/02* (2013.01); *H04L 41/509* (2013.01); *H04L 41/5038* (2013.01); *Y10S 707/99948* (2013.01)

(58) Field of Classification Search
USPC ......... 709/201, 202, 203, 204, 205, 206, 216, 709/217, 218, 219, 220, 221, 223, 224, 225, 709/226, 227, 228; 707/640, 692, 741, 654, 707/661, 664, 694, 696, 728, 736, 758; 711/E12.001, E12.103, 162
IPC .................... H04L 29/08072, 41/5048, 41/5038, H04L 41/509, 67/02, 67/1095, 67/1097, 67/22, H04L 67/28, 67/2852, 43/10, 43/50; G06F 11/3485, 17/30082, 17/30156, 17/302, 17/30215, G06F 17/30312, 3/0605, 3/0631, 3/067
See application file for complete search history.

(56) References Cited

U.S. PATENT DOCUMENTS

| | | | |
|---|---|---|---|
| 4,899,299 A | 2/1990 | MacPhail | |
| 5,442,771 A | 8/1995 | Filepp et al. | |

(Continued)

FOREIGN PATENT DOCUMENTS

GB    2346229    8/2000

OTHER PUBLICATIONS

United States Patent and Trademark Office, Decision on Appeal, for U.S. Appl. No. 10/159,311, issued on Mar. 15, 2011, (10 pages).

(Continued)

*Primary Examiner* — Saket K Daftuar
(74) *Attorney, Agent, or Firm* — Hanley, Flight & Zimmerman, LLC

(57) ABSTRACT

One preferred embodiment of the present invention provides systems and methods for analyzing the delivery performance of newsgroup services. Briefly described, in architecture, one embodiment, among others, includes a newsgroup evaluation system configured to determine a delivery rate for a newsgroup server. In other embodiments, methods and systems are provided for analyzing completion and retention for newsgroup services.

20 Claims, 15 Drawing Sheets

(51) Int. Cl.
*G06F 15/16* (2006.01)
*H04L 29/08* (2006.01)
*H04L 12/26* (2006.01)
*H04L 12/24* (2006.01)

(56) References Cited

U.S. PATENT DOCUMENTS

| | | | |
|---|---|---|---|
| 5,794,039 A | 8/1998 | Guck | |
| 5,799,304 A | 8/1998 | Miller | |
| 5,870,558 A | 2/1999 | Branton, Jr. et al. | |
| 5,974,572 A | 10/1999 | Weinberg et al. | |
| 6,016,475 A | 1/2000 | Miller et al. | |
| 6,038,601 A | 3/2000 | Lambert et al. | |
| 6,072,800 A | 6/2000 | Lee | |
| 6,138,157 A | 10/2000 | Welter et al. | |
| 6,157,940 A | 12/2000 | Marullo et al. | |
| 6,314,463 B1 | 11/2001 | Abbott et al. | |
| 6,356,936 B1 | 3/2002 | Donoho et al. | |
| 6,359,635 B1 | 3/2002 | Perttunen | |
| 6,393,386 B1 | 5/2002 | Zager et al. | |
| 6,393,480 B1 | 5/2002 | Qin et al. | |
| 6,415,307 B2 | 7/2002 | Jones et al. | |
| 6,438,592 B1 | 8/2002 | Killian | |
| 6,446,120 B1 | 9/2002 | Dantressangle | |
| 6,449,739 B1 | 9/2002 | Landan | |
| 6,477,522 B1 | 11/2002 | Young | |
| 6,546,390 B1 | 4/2003 | Pollack et al. | |
| 6,546,488 B2 | 4/2003 | Dillon et al. | |
| 6,571,285 B1 | 5/2003 | Groath et al. | |
| 6,633,230 B2 | 10/2003 | Grandin et al. | |
| 6,633,907 B1 | 10/2003 | Spencer et al. | |
| 6,687,746 B1 | 2/2004 | Shuster et al. | |
| 6,701,363 B1 | 3/2004 | Chiu et al. | |
| 6,704,284 B1 | 3/2004 | Stevenson et al. | |
| 6,738,813 B1 | 5/2004 | Reichman | |
| 6,748,534 B1 | 6/2004 | Gryaznov et al. | |
| 6,754,701 B1 | 6/2004 | Kessner | |
| 6,757,543 B2 | 6/2004 | Moran et al. | |
| 6,775,661 B1 | 8/2004 | Redner | |
| 6,789,050 B1 | 9/2004 | Van Der Mei et al. | |
| 6,795,858 B1 | 9/2004 | Jain et al. | |
| 6,810,411 B1 | 10/2004 | Coughlin et al. | |
| 6,862,622 B2 | 3/2005 | Jorgensen | |
| 6,862,623 B1 | 3/2005 | Odhner et al. | |
| 6,879,998 B1 | 4/2005 | Raciborski et al. | |
| 6,889,257 B1 | 5/2005 | Patel | |
| 6,959,295 B1* | 10/2005 | Puscar et al. | 1/1 |
| 7,058,722 B2 | 6/2006 | Ikami et al. | |
| 7,072,968 B2 | 7/2006 | Mikami et al. | |
| 7,181,504 B1 | 2/2007 | Chebrolu | |
| 7,295,516 B1 | 11/2007 | Ye | |
| 2001/0029537 A1 | 10/2001 | Klein | |
| 2002/0026440 A1 | 2/2002 | Nair | |
| 2002/0042823 A1 | 4/2002 | DeBettencourt et al. | |
| 2002/0059526 A1* | 5/2002 | Dillon et al. | 713/201 |
| 2002/0069284 A1 | 6/2002 | Slemmer et al. | |
| 2002/0087636 A1 | 7/2002 | Matsuda et al. | |
| 2002/0107882 A1 | 8/2002 | Gorelick et al. | |
| 2002/0112049 A1 | 8/2002 | Elnozahy et al. | |
| 2002/0116240 A1 | 8/2002 | Hsuan | |
| 2002/0147667 A1 | 10/2002 | Shiba et al. | |
| 2002/0152303 A1 | 10/2002 | Dispensa | |
| 2002/0167942 A1 | 11/2002 | Fulton | |
| 2002/0181637 A1 | 12/2002 | Nakabayashi | |
| 2002/0198985 A1* | 12/2002 | Fraenkel et al. | 709/224 |
| 2003/0052999 A1 | 3/2003 | Weber | |
| 2003/0110293 A1 | 6/2003 | Friedman et al. | |
| 2003/0130983 A1 | 7/2003 | Rebane | |
| 2003/0187998 A1 | 10/2003 | Petit | |
| 2003/0188263 A1 | 10/2003 | Bates et al. | |
| 2003/0204588 A1 | 10/2003 | Peebles et al. | |
| 2003/0204781 A1 | 10/2003 | Peebles et al. | |
| 2003/0217144 A1 | 11/2003 | Fu et al. | |
| 2003/0221000 A1 | 11/2003 | Cherkasova et al. | |
| 2004/0088386 A1 | 5/2004 | Aggarwal | |
| 2004/0088405 A1 | 5/2004 | Aggarwal | |
| 2005/0076111 A1 | 4/2005 | Cherkasova et al. | |

OTHER PUBLICATIONS

United States Patent and Trademark Office, Examiner's Answer to Appeal Brief, for U.S. Appl. No. 10/159,311, issued on Sep. 20, 2007, (33 pages).
United States Patent and Trademark Office, Notice of Allowance and Fee(s) Due, for U.S. Appl. No. 10/158,816, mailed on Oct. 28, 2008, (20 pages).
United States Patent and Trademark Office, Final Rejection, for U.S. Appl. No. 10/158,816, issued on Mar. 17, 2008, (33 pages).
United States Patent and Trademark Office, Non-Final Rejection, for U.S. Appl. No. 10/158,816, issued on Sep. 11, 2007, (39 pages).
United States Patent and Trademark Office, Final Rejection, for U.S. Appl. No. 10/158,816, mailed on Mar. 23, 2007, (33 pages).
United States Patent and Trademark Office, Non-Final Rejection, for U.S. Appl. No. 10/159,414, mailed on Jul. 13, 2005, (8 pages).
United States Patent and Trademark Office, Notice of Allowance, for U.S. Appl. No. 10/197,964, mailed on Jan. 5, 2012 (7 pages).
United States Patent and Trademark Office, Board Decision, for U.S. Appl. No. 10/197,964, mailed on Oct. 12, 2011 (5 pages).
United States Patent and Trademark Office. Examiner's Answer, for U.S. Appl. No. 10/197,964, mailed on Mar. 12, 2009 (20 pages).
United States Patent and Trademark Office, Advisory Action, for U.S. Appl. No. 10/197,964, mailed on Sep. 30, 2008 (3 pages).
United States Patent and Trademark Office, Final Rejection, for U.S. Appl. No. 10/197,964, mailed on Jun. 13, 2008 (9 pages).
WebUseNet Network Statistics; Entitled: BeliSouth NTIP Statistics; http://stats.bs.webusenet.com; main page, Network Statistics, Port Statistics; 3 pages; publicly available prior to May 30, 2002. (provided in U.S. Appl. No. 10/197,964 to which priority is claimed).
WebUsenet is a provider of usenet services to internet service providers (ISPs). As part of this service, WebUsenet provides network statistical data to the ISP concerning the performance of the usenet service, as demonstrated by the attached documents, which are of the type that were publicly available before May 30, 2002. (statement and attached documents provided in U.S. Appl. No. 10/197,964 to which priority is claimed).
Gerlach; U.S. Appl. No. 10/159,311, filed May 30, 2002.
Gerlach; U.S. Appl. No. 10/158,816, filed May 30, 2002.
Gerlach; U.S. Appl. No. 10/159,414, filed May 30, 2002.
Gerlach; Non-Final Rejection mailed Jul. 13, 2005 for U.S. Appl. No. 10/159,311, filed May 30, 2002.
Gerlach; Examiner Interview Summary Record mailed Sep. 23, 2005 for U.S. Appl. No. 10/159,311, filed May 30, 2002.
Gerlach; Final Rejection mailed Dec. 27, 2005 for U.S. Appl. No. 10/159,311, filed May 30, 2002.
Gerlach; Non-Final Rejection mailed Jun. 29, 2006 for U.S. Appl. No. 10/159,311, filed May 30, 2002.
Gerlach; Final Rejection mailed Dec. 15, 2006 for U.S. Appl. No. 10/159,311, filed May 30, 2002.
Gerlach; Pre-Brief Appeal Conference Decision mailed May 14, 2007 for U.S. Appl. No. 10/159,311, filed May 30, 2002.
Gerlach; Non-Final Rejection mailed Oct. 6, 2005 for U.S. Appl. No. 10/158,816, filed May 30, 2002.
Gerlach; Final Rejection mailed Mar. 24, 2006 for U.S. Appl. No. 10/158,816, filed May 30, 2002.
Gerlach; Non-Final Rejection mailed Oct. 10, 2006 for U.S. Appl. No. 10/158,816, filed May 30, 2002.
Gerlach; Final Rejection mailed Mar. 23, 2007 for U.S. Appl. No. 10/158,816, filed May 30, 2002.
Gerlach; Non-Final Rejection mailed Sep. 11, 2007 for U.S. Appl. No. 10/158,816, filed May 30, 2002.
Gerlach; Final Rejection mailed Mar. 17, 2008 for U.S. Appl. No. 10/158,816, filed May 30, 2002.
United States Patent and Trademark Office, Non-Final Rejection, for U.S. Appl. No. 10/197,964, mailed on Dec. 26, 2007 (11 pages).
United States Patent and Trademark Office, Pre-Appeal Decision, for U.S. Appl. No. 10/197,964, mailed on Oct. 31, 2007 (2 pages).

(56) References Cited

OTHER PUBLICATIONS

United States Patent and Trademark Office. Final Rejection, for U.S. Appl. No. 10/197,964, mailed on Mar. 20, 2007 (16 pages).
United States Patent and Trademark Office, Non-Final Rejection, for U.S. Appl. No. 10/197,964, mailed on Nov. 22, 2006 (13 pages).
United States Patent and Trademark Office, Non-Final Rejection, for U.S. Appl. No. 10/197,964, mailed on Jun. 20, 2006 (11 pages).
United States Patent and Trademark Office, Final Rejection, for U.S. Appl. No. 10/197,964, mailed on Jan. 27, 2006 (13 pages).
United States Patent and Trademark Office, Non-Final Rejection, for U.S. Appl. No. 10/197,964, mailed on Aug. 17, 2005 (12 pages).
United States Patent and Trademark Office, Non-Final Rejection, for U.S. Appl. No. 13/586,513, mailed on Jan. 3, 2013 (44 pages).
United States Patent and Trademark Office, Notice of Allowance, for U.S. Appl. No. 13/586,513, mailed on Apr. 19, 2013 (22 pages).

* cited by examiner

DELIVERY PERFORMANCE ANALYSIS FOR INTERNET SERVICES

RELATED APPLICATIONS

This patent arises from a continuation of U.S. patent application Ser. No. 13/586,513, filed Aug. 15, 2012, now U.S. Pat. No. 8,621,076, which is a continuation of U.S. patent application Ser. No. 10/197,964, filed on Jul. 16, 2002, now U.S. Pat. No. 8,266,270. U.S. patent application Ser. No. 13/586,513 and U.S. patent application Ser. No. 10/197,964 are hereby incorporated herein by reference in their entireties.

TECHNICAL FIELD

The present invention is generally related to the Internet and, more particularly, is related to systems and methods for analyzing the performance of Internet services.

BACKGROUND

An Internet service provider (ISP) typically provides a core group of Internet utilities and service to its customers. Core services often include newsgroups along with Email, World Wide Web (WWW), File Transfer Protocol (FTP), Telnet, Internet Relay Chat (IRC), etc. Newsgroups typically include a collection of topical message boards that ISP customers may post to and read messages from. The most widely available distribution of newsgroups is Usenet.

Usenet currently refers to a collection of approximately 90,000 newsgroups and is operated on thousands of newsgroup servers over the Internet or on networks employing the network news transfer protocol (NNTP). To distribute messages or articles within the network, a local newsgroup server for an ISP communicates with other newsgroup servers and compares newsgroup databases. A newsgroup server requests and receives from other servers any messages that the newsgroup server does not have. An ISP customer or newsgroup user may then access his or her local newsgroup server and retrieve messages from the local newsgroup server.

Articles or messages submitted to newsgroups are designed for discussion and are only accepted as text files. However, a binary file can be posted to newsgroups by converting the binary file to a text file. One way to post a binary file on a newsgroup is to use a program supporting UUEncode. UUEncode encodes binary data into a text message that may be posted on a newsgroup. Once posted, a user may retrieve the article or posting from the newsgroup to his or her computer and reconvert the file back to binary data using the UUDecode program. MIME (Multipurpose Internet Mail Extensions), a method used to add binary attachments to email, is another process for encoding binary data into a text message.

Newsgroups are organized into hierarchies based on subject distinctions. For example, several newsgroups are dedicated to binary postings. Binary postings tend to be very large as compared to text postings and do not transmit easily. In fact, some newsgroup servers prohibit posting of articles that are larger than a specific size. Therefore, a system called "Multipart Message" may be used to break up a large binary message into smaller message parts. In the system, many small messages are posted to a newsgroup, rather than one large message. A user may then retrieve all the message parts and reassemble them into a single binary file. A multipart message is identified by examining the end of a subject line of a message. All the parts of a multipart message will have a subject line that ends with [xx/yy]. For example, the first part of a 10 part message will end with [0111 0] and the fifth part will end with [0511 0], etc.

To retrieve or download messages, a user may use a separate newsreader program or a WWW browser with an inbuilt newsreader. The newsreader accesses the ISP's local newsgroup server, enabling a user to pull down as many newsgroups and articles as the user desires. However, to make newsgroups available to users, the ISP's newsgroup server has to dedicate hard drive space for storage. Accordingly, newsgroup articles are only available to users for a limited time before they are deleted to make room for new article postings.

Retention is the period of time that an article or message is accessible in a newsgroup. As articles in the newsgroup age beyond the retention period, the old articles are deleted from the server. A retention period may not be the same for all newsgroups. Some newsgroups, by their natures, involve large articles often incorporating binary files, such as images, music files, or video files. Because of the large amount of resources required by such groups, an ISP will typically set the retention of binary articles lower than the retention period for newsgroups that contain text articles. If a newsgroup's retention is set too low, however, users will not have adequate opportunity to view a newsgroup's content. Therefore, retention performance is a characteristic of the quality of newsgroup services being provided by an ISP.

Two other characteristics in evaluating newsgroup services are completion and delivery performance. Completion refers to how often all parts of a multipart binary message are available at the same time at one newsgroup. Since all parts of a multipart message are needed to completely reassemble a binary file, it is important for all the parts to be accessible in a newsgroup. Therefore, a completion rate may be specified as a percentage of all the multipart files that are present in a newsgroup at the same time. If a newsgroup has a poor completion rate, then a user cannot successfully retrieve and enjoy much of the content in the newsgroup.

Delivery performance, on the other hand, is the measurement of the speed at which a newsgroup article can be retrieved from a newsgroup server, independently of network characteristics. While traditional methods of monitoring Internet delivery performance, such as pings and traceroutes, may be adequate to evaluate some Internet services, these traditional methods do not sufficiently measure the level of retention, completion, and delivery performances being provided by a newsgroup service. For example, although a ping program may determine if a specific IP address of the newsgroup server is working, it cannot tell if a newsgroup server is capable of sending and receiving high speed transmissions. Correspondingly, a traceroute utility cannot reveal if a newsgroup server is fully capable of performing all the newsgroup services that the newsgroup server is expected to.

Therefore, for an ISP to assess the quality of newsgroup service that it provides to its customers, an ISP needs a legitimate way to test the characteristics of newsgroup service. Thus, a heretofore unaddressed need exists in the industry to address the aforementioned deficiencies and inadequacies.

SUMMARY

Preferred embodiments of the present invention provide a system and method for analyzing the delivery performance of newsgroup services. Briefly described, in architecture, one embodiment of the system, among others, can be implemented as follows. A newsgroup server supplies newsgroup access to an Internet service provider (ISP). To evaluate the performance of the newsgroup service, a newsgroup evaluation system communicates with the Internet service provider and performs a delivery evaluation task on the newsgroup server.

One preferred embodiment of the present invention can also be viewed as providing methods for analyzing the delivery performance of a newsgroup service. In this regard, one embodiment of such a method, among others, can be broadly summarized by the following steps: determining a delivery rate for a newsgroup server; and saving the delivery rate. Other embodiments include completion and retention evaluations in addition to the delivery evaluation.

Other systems, methods, features, and advantages of the present invention will be or become apparent to one with skill in the art upon examination of the following drawings and detailed description. It is intended that all such additional systems, methods, features, and advantages be included within this description and be within the scope of the present invention.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figure 1:
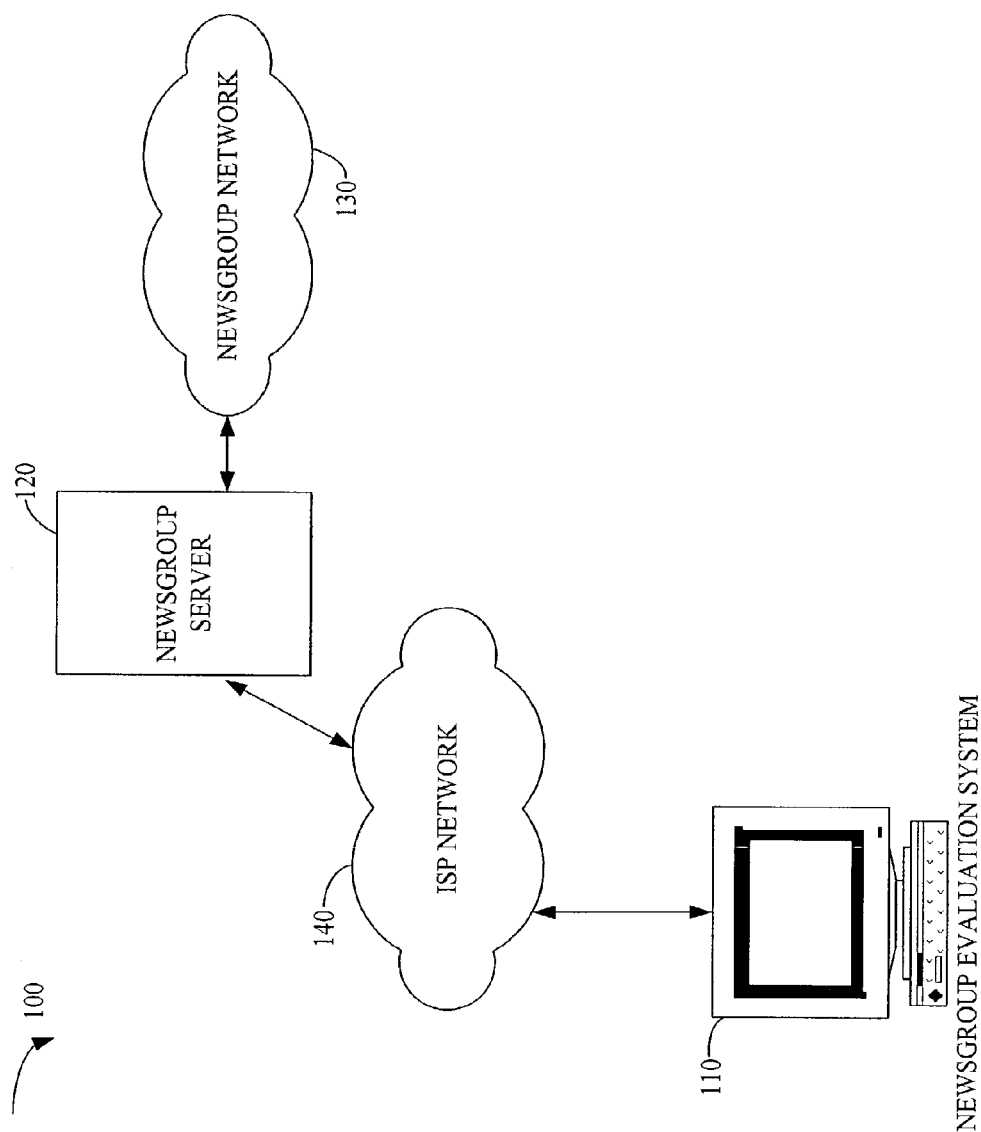
FIG. 1 is a schematic representation of one system for newsgroup performance analysis according to one preferred embodiment of the present invention.

Depicted in FIG. 1 is one preferred embodiment of a system for newsgroup performance analysis 100 of the present invention. As shown in FIG. 1, system 100 includes a newsgroup evaluation system 110 that is adapted to monitor the quality of service being provided by a newsgroup provider to an internet service provider (ISP). The newsgroup provider supplies newsgroup service to an ISP by providing the ISP access to a newsgroup server 120 that stores messages posted directly to the server via ISP network 140 or stores messages received from the newsgroup network 130. As described in greater detail hereinafter, the newsgroup evaluation system 110 acquires objective information from the newsgroup server 120 that is relevant to evaluating the quality of service being provided by the newsgroup provider to an ISP. In this regard, the newsgroup evaluation system 110 communicates with the newsgroup server 120 via the ISP network 140. As described in greater detail hereinafter, the newsgroup evaluation system 110 generates output data in various formats based upon the intent of the user.

The ISP network 140 is the communication network available to an ISP and its customers. Typically, the ISP network 140 provides access to Internet services such as email, FTP, WWW, IRC, etc. and newsgroups via the newsgroup server 120. A newsgroup server 120 stores and forwards newsgroup articles throughout the newsgroup network 130 that the newsgroup server 120 receives from other newsgroup servers or that the newsgroup server 120 receives from a local user posting. The newsgroup network 130 is composed of newsgroup servers 120 that provide access to a collection of newsgroups, such as Usenet. Newsgroup network 130 may be any type of newsgroup network such as the Internet or a network employing a newsgroup protocol such as, Network News Transfer Protocol (NNTP), for example.

The newsgroup evaluation system 110 has access to a newsgroup server 120. Typically, access is provided through the ISP network 140. The newsgroup evaluation system 110 evaluates the performance of a newsgroup service provider by monitoring the quality of newsgroup services being provided to the newsgroup server 120. In particular, the newsgroup evaluation system 110 analyzes the delivery performance of the newsgroup server 120.

I. Architecture

The newsgroup evaluation system 110 of the present invention can be implemented in software, firmware, hardware, or a combination thereof. Preferably, the newsgroup evaluation system 110 is implemented in software, as an executable program, and is executed by a special or general purpose digital computer, such as a personal computer, workstation, minicomputer, or mainframe computer. An example of a general purpose computer that can implement the newsgroup evaluation system 110 of the present invention is shown in FIG. 2.

Figure 2:
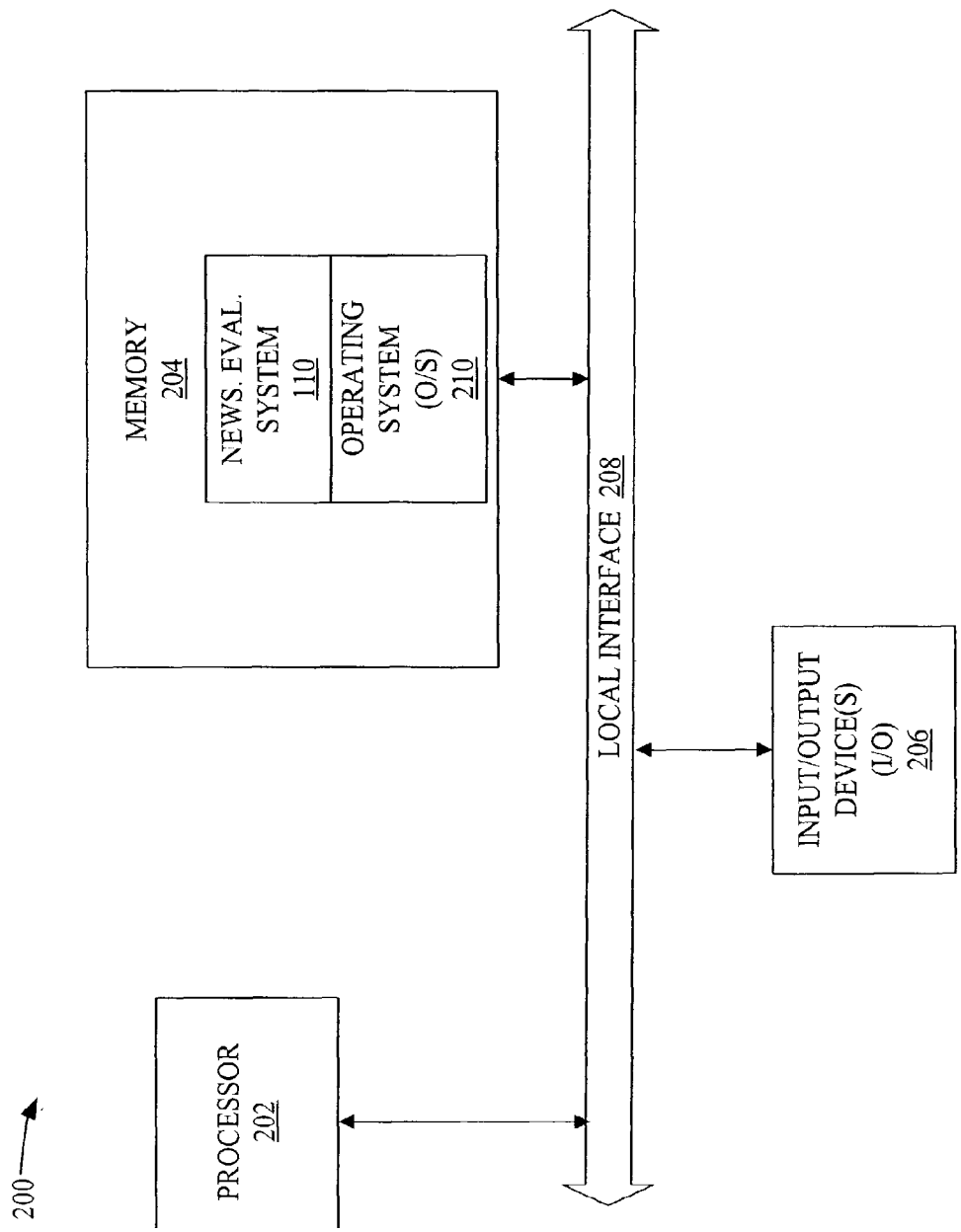
FIG. 2 is a schematic representation of an implementation of one preferred embodiment of the newsgroup evaluation system in FIG. 1 using a general computer system.

Generally, in terms of hardware architecture, as shown in FIG. 2, the computer 200 includes a processor 202, memory 204, and one or more input and/or output (I/O) devices 206 (or peripherals) that are communicatively coupled via a local interface 208. The local interface 208 can be, for example but not limited to, one or more buses or other wired or wireless connections, as is known in the art. The local interface 208 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 202 may be a hardware device for executing software that can be stored in memory 204. The processor 202 can be any custom made or commercially available processor, a central processing unit (CPU) or an auxiliary processor among several processors associated with the computer 200, and a semiconductor based microprocessor (in the form of a microchip) or a macroprocessor.

The memory 204 can include anyone or combination of volatile memory elements (e.g., random access memory (RAM, such as DRAM, SRAM, etc.)) and nonvolatile memory elements (e.g., ROM, hard drive, tape, CDROM, etc.). Moreover, the memory 204 may incorporate electronic, magnetic, optical, and/or other types of storage media. Note that the memory 204 can have a distributed architecture, where various components are situated remote from one another, but can be accessed by the processor 202.

The software in memory 204 may include one or more separate programs, each of which comprises an ordered listing of executable instructions for implementing logical functions. In the example of FIG. 2, the software in the memory 204 includes the newsgroup evaluation system 110 and an operating system (O/S) 210. The operating system 210 essentially controls the execution of other computer programs, and provides scheduling, input-output control, file and data management, memory management, and communication control and related services.

The newsgroup evaluation system 110 may be a source program, executable program (object code), script, or any other entity comprising a set of instructions to be performed. If the newsgroup evaluation system 110 is a source program, then the program needs to be translated via a compiler, assembler, interpreter, or the like, which may or may not be included within the memory 204, so as to operate properly in connection with the O/S 210. Furthermore, the newsgroup evaluation system 110 can be written as (a) an object oriented programming language, which has classes of data and methods, or (b) a procedure programming language, which has routines, subroutines, and/or functions, for example but not limited to, C, C++, Pascal, Basic, Fortran, Cobol, Perl, Java, and Ada.

The I/O devices 206 may include input devices, for example but not limited to, a keyboard, mouse, scanner, digital camera, multi-function device, digital sender, microphone, etc. Furthermore, the I/O devices 206 may also include output devices, for example but not limited to, a printer, display, etc. Finally, the I/O devices 206 may further include devices that communicate both inputs and outputs, for instance but not limited to, a modulator/demodulator (modem; for accessing another device, system, or network), a radio frequency (RF) or other transceiver, a telephonic interface, a bridge, a router, etc.

If the computer 200 is a PC, workstation, or the like, the software in the memory 204 may further include a basic input output system (BIOS) (omitted for simplicity). The BIOS is a set of essential software routines that initialize and test hardware at startup, start the O/S 210, and support the transfer of data among the hardware devices. The BIOS is stored in ROM so that the BIOS can be executed when the computer 200 is activated.

When the computer 200 is in operation, the processor 202 is configured to execute software stored within the memory 204, to communicate data to and from the memory 204, and to generally control operations of the computer 200 pursuant to the software. The newsgroup evaluation system 110 and the O/S 210, in whole or in part, but typically the latter, are read by the processor 202, perhaps buffered within the processor 202, and then executed.

When the newsgroup evaluation system 110 is implemented in software, as is shown in FIG. 2, it should be noted that the newsgroup evaluation system 110 can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The newsgroup evaluation system 110 can be embodied in any computer-readable medium for use by or in connection with an instruction execution system, apparatus, or device, such as a computer-based system, processor containing system, or other system that can fetch the instructions from the instruction execution system, apparatus, or device and execute the instructions.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the newsgroup evaluation system 110 is implemented in hardware, the newsgroup evaluation system 110 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array (s) (PGA), a field programmable gate array (FPGA), etc.

II. Operation a. Delivery Performance

The flowcharts of FIGS. 3-8 show the functionality of a representative implementation of one preferred embodiment of a newsgroup evaluation system 110 of the present invention. It should also be noted that in some alternative implementations the functions noted in the various blocks may occur out of the order depicted in the flowcharts of FIGS. 3-8. For example, two blocks shown in succession in FIG. 3 may, in fact, be executed substantially concurrently. Alternatively, the blocks may sometimes be executed in the reverse order depending upon the functionality involved.

Figure 3:
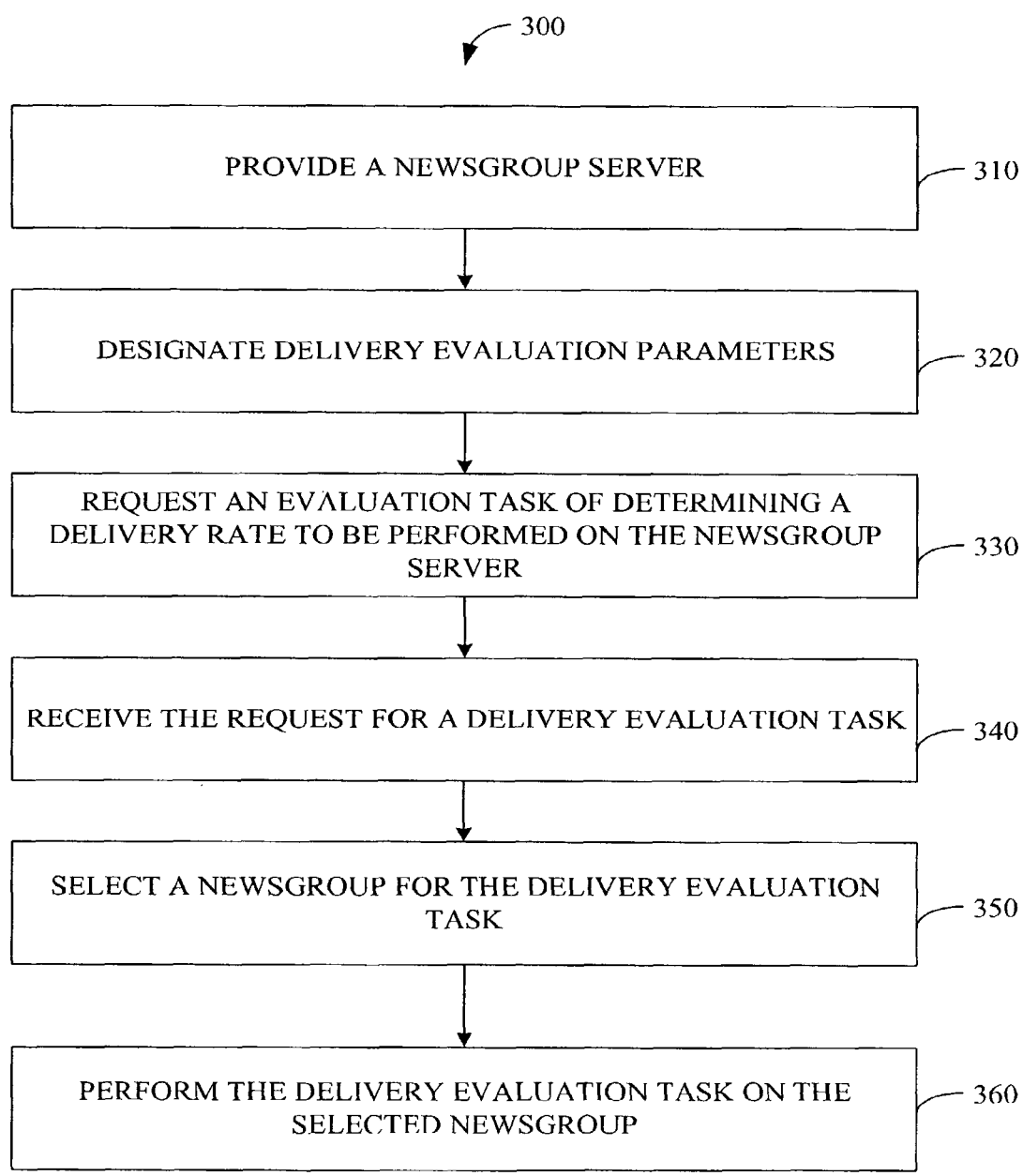
FIG. 3 is a flowchart describing the functionality of performing a delivery evaluation task in the newsgroup evaluation system of FIG. 1.

As depicted in FIG. 3, the functionality of a representative embodiment of the newsgroup evaluation system 110 or method 300 may be construed as beginning at block 310. In block 310, a newsgroup server 120 supplying newsgroup service is provided. In block 320, delivery evaluation parameters for a delivery evaluation task are designated. The delivery evaluation task involves the determination of a delivery rate for the newsgroup server 120. The delivery rate is the measurement of the speed at which a newsgroup article can be retrieved from a newsgroup server 120. Delivery evaluation parameters include the criteria for determining this delivery rate.

One of the criteria in the delivery evaluation parameters is the nominal speed for a newsgroup. The nominal speed is the minimum acceptable delivery rate for a newsgroup as specified by a network administrator, for example. Therefore, a nominal speed of 150 KiloBytes/second signifies that the delivery rate for a newsgroup should be at 150 KiloBytes/second or greater. Additional delivery evaluation parameters include the name of a newsgroup to be examined, the name of a test file, and the size of the test file. These delivery evaluation parameters and others will be discussed in more detail hereinafter.

In block 330, a request is generated to perform the delivery evaluation task on the newsgroup server 120. The request may be generated by a command from a user or network administrator, such as a keystroke from a keyboard or a mouse input. In some embodiments of the invention, a user may schedule for requests of the delivery evaluation tasks to be generated. For example, a user may schedule a delivery evaluation task to be performed at the same time every week or perhaps multiple times an hour (e.g. 6 times an hour). Then on the scheduled time and day, a request will automatically be generated for performance of the delivery evaluation task. Once a request is received in block 340, a newsgroup is selected to be the subject of the delivery evaluation task, as depicted in block 350. In the delivery evaluation parameters, a particular newsgroup is designated. As depicted in block 360, the delivery evaluation task is performed on the selected newsgroup by determining a delivery rate for the newsgroup.

Figure 4:
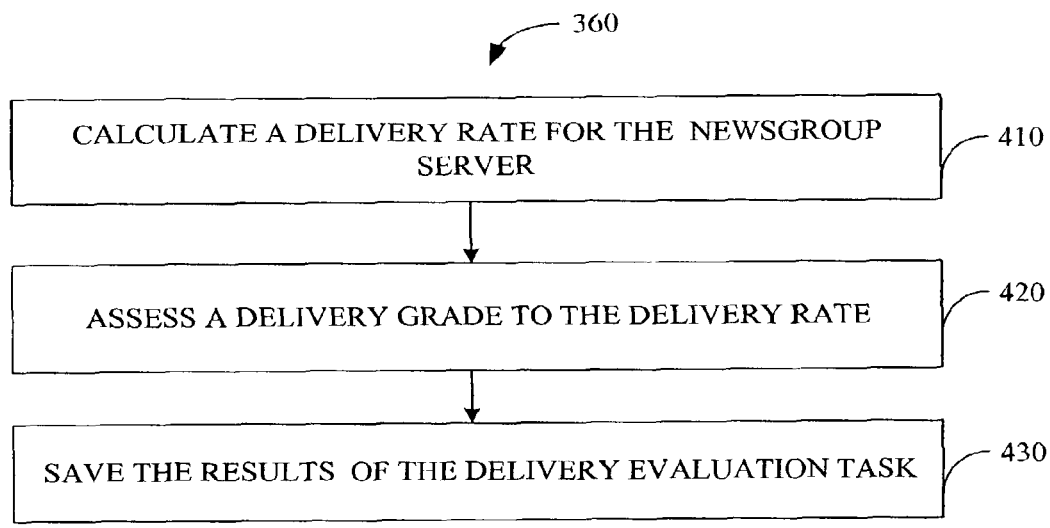
FIG. 4 is a flowchart describing the process of performing the delivery evaluation task in FIG. 3.

Referring now to the flowchart of FIG. 4, the performance of the delivery evaluation task 360 is described in greater detail for a representative implementation of one preferred embodiment of the invention. In block 410, a delivery rate is measured for the newsgroup server 120. To determine the delivery rate for the newsgroup server 120, the newsgroup evaluation system 110 posts a test file of a known size to a newsgroup named in the delivery evaluation parameters. Then the newsgroup evaluation system 110 retrieves the test file from the newsgroup. By observing the amount of time it takes to download the test file from the newsgroup, the newsgroup evaluation system 110 ascertains the delivery rate of the newsgroup server 120 by dividing the size of the test file by the amount of time it took to download the file. For example, if the test file is the size of 1 MegaByte (as specified in the evaluation parameters), and the newsgroup evaluation system 110 downloads the file in 10 seconds, the delivery rate for the newsgroup server 120 is (1×106 Bytes/10 seconds) or 100 KiloBytes/second.

After the delivery rate is calculated, the delivery rate is compared to the nominal speed and is assessed a delivery grade, as shown in block 420. Note, the nominal speed is specified in the delivery evaluation parameters. In an earlier example, the nominal speed for the newsgroup server 120 was 150 KiloBytes/second. Therefore, if the delivery rate for the newsgroup server 120 is calculated to be 100 KiloBytes/second, the delivery rate is less than the nominal speed for the newsgroup server 120. Accordingly, the delivery grade for the delivery rate is FAILURE. If the delivery rate was equal to or greater than the nominal speed, then a delivery grade of PASSING could have been assessed.

Two types of ping tests are also performed before and after each delivery rate measurement to test the operability of the ISP network 140 and the newsgroup network 130. An "end to end" ping measurement is performed on the newsgroup server 120. Since the newsgroup server 120 may be outside of the ISP network 140, an "ISP network only" ping measurement is also performed on the last server in the ISP network 140 to test the status of the ISP's network. If these pings indicate that the ISP network 140 or the network as a whole (e.g. ISP network 140 and the newsgroup network 130) has problem in the network between the newsgroup evaluation system 110 and the newsgroup server 120, the measurement of the delivery rate can be disregarded (or otherwise compensated) by the user, since the network is incapable of supporting a delivery rate above the nominal speed. In block 430, the results of the delivery evaluation task comparison are saved.

Figure 5:
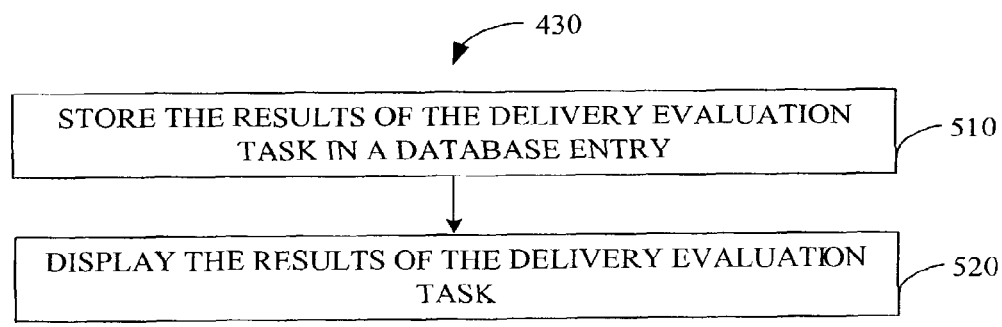
FIG. 5 is a flowchart describing the process of saving the results of the delivery evaluation task in FIG. 4.

Referring now to the flowchart of FIG. 5, the saving of the results from the delivery evaluation task 430 is described in greater detail for a representative implementation of the invention. In block 510, the delivery rate and delivery grade for the newsgroup server 120 is stored on a storage medium such as a hard drive of a computer. In a preferred embodiment of the invention, the delivery rate and the delivery grade are logged as an entry in a record-keeping database located on the hard drive of the computer. In addition to the delivery rate, other information, such as the name of the newsgroup that was the subject of the delivery evaluation task, the date and time the delivery rate was determined, and the ping measurements can also be stored. In block 520, the results of the delivery evaluation task are displayed to a user of the newsgroup evaluation system.

Figure 6:
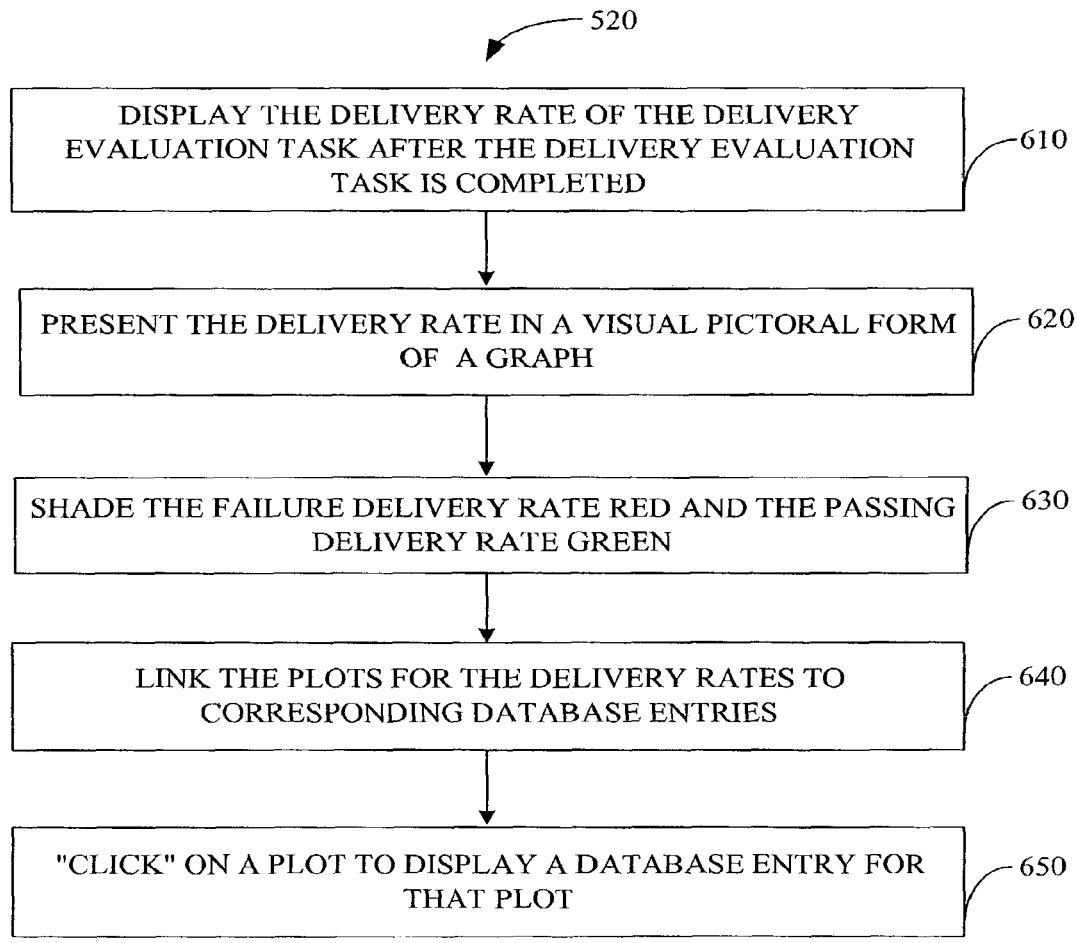
FIG. 6 is a flowchart describing the process of displaying the results of the delivery evaluation task in FIG. 5.

Referring now to the flowchart of FIG. 6, the displaying of the results from the delivery evaluation task 520 is described in greater detail for a representative implementation of the invention. In block 610, the delivery rate of the delivery evaluation task and the delivery grade are displayed to the user after the delivery evaluation task is completed. Depending upon the intent of the user, the delivery rate and grade may be displayed with other relevant information such as the date and time the delivery evaluation task was completed. A user may also retrieve prior results from the delivery evaluation tasks, since earlier delivery rates and grades are stored in a storage medium.

The delivery rates may be presented to a user in a visual pictorial form, such as a graph, table, or chart. In FIG. 6, block 620 depicts the delivery rate being plotted on a graph. The graph may also represent the delivery grade (e.g., FAILURE or PASSING) for the corresponding delivery rate. As depicted in block 630, a plot of a delivery rate that was a FAILURE may be shaded one color, e.g. red, while a plot of a delivery rate that was PASSING may be shaded in another color, e.g. green. Further in block 640, the plots of the delivery rates on the graph may be linked to the corresponding database entry for that delivery rate, so that a user may click on the plot on the graph for a delivery rate and have the entry for that particular delivery rate from the database be retrieved and displayed to the user, as depicted in block 650. It is contemplated that a user of the newsgroup evaluation system 110 can configure outputs to conform to the user's needs and preferences.

Figure 7:
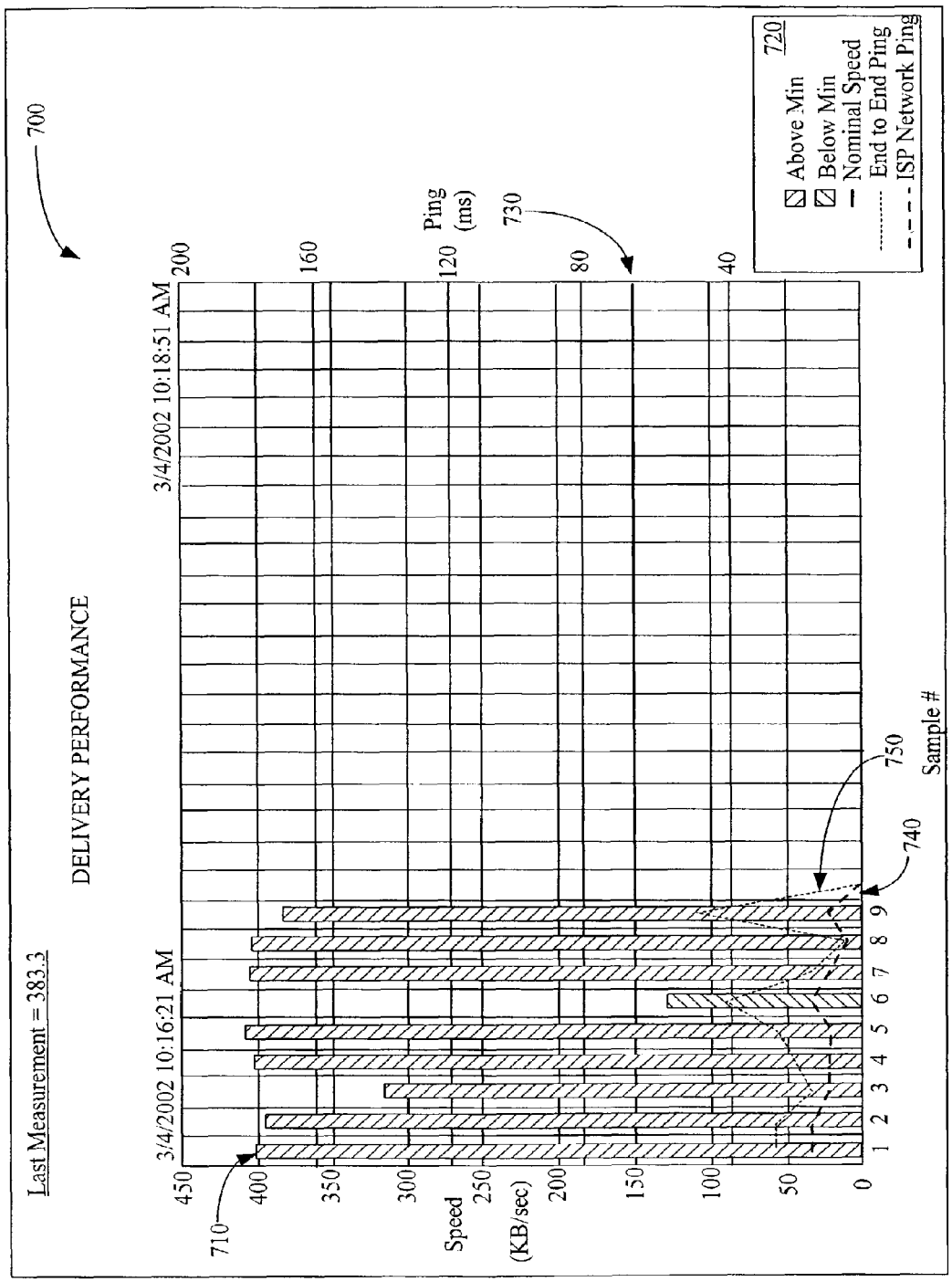
FIG. 7 is a representation of a delivery performance graph 700 that may be produced by the display process in FIG. 6

FIG. 7 is a representation of a delivery performance graph 700 that may be produced by one preferred embodiment of the present invention. In particular, the graph displays one vertical bar 710 for each test cycle. The height of each bar indicates the measured delivery rate in KiloBytes/second and the bar color or shading indicates whether the delivery rate met or failed to meet the specified nominal speed. The legend 720 on the right of the graph indicates what colors or shadings have been assigned to each measurement function. The nominal speed is indicated by the bold horizontal line 730 which is shown to be 150 KiloBytes/second. In this representation, various ping tests have also been performed before and after each delivery rate measurement. These ping test results, measured in milliseconds, are shown as colored or shaded graph lines: one color or shade for an "end to end" measurement 740 and another color or shade for an "ISP network only" measurement 750. As discussed previously, the ping measurements provide a standard by which to access or gauge a delivery rate.

Figure 8:
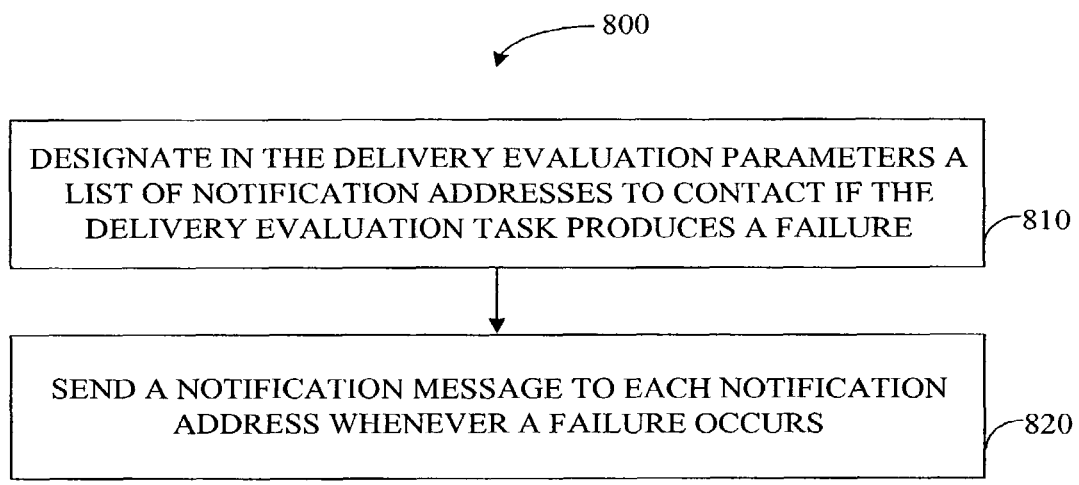
FIG. 8 is a flowchart describing the process of sending notification messages for the delivery evaluation task according to one preferred embodiment of the present invention.

For a delivery rate that receives a delivery grade of FAILURE, a representative implementation of one preferred embodiment of the present invention sends a notification message to designated recipients, as shown by the flowchart of FIG. 8. In block 810, the delivery evaluation parameters include a list of notification addresses that notification messages are sent to, whenever a FAILURE occurs. The notification list can include an address for one person, multiple addresses for one person, or addresses for more than one person. Typically, the notification address is an email address that can be used to send an email message over the Internet to a person's computer or through wireless communications to a person's wireless communication device, such as, among others, a cell phone or interactive pager. In alternative embodiments, however, the notification address could be an address for other messaging technologies such as, among others, 5 instant messaging.

When a delivery rate results that is lower than the nominal speed for the newsgroup server 120, a notification message is sent to the notification addresses in the notification list, as shown in block 820. Otherwise, this is known as a FAILURE result. The notification message informs the recipient that the newsgroup service is not performing at a desired standard. The content of the message contains relevant information about the failed delivery evaluation task such as the ping measurements, the delivery rate, and the date and time that the delivery evaluation task took place. Accordingly, an ISP can then gauge the quality of newsgroup service being provided by its newsgroup service provider and request compensation from the newsgroup service provider if the service is not satisfactory.

In alternative implementations of preferred embodiments of the invention, a notification message may be sent only after a specified number of FAILURES occur. For example, if the network evaluation system 110 determines a delivery rate and delivery grade 6 times an hour, the network evaluation system 110 may only send a notification message if the network evaluation system 110 observes at least 32 FAILURES out of 4000 delivery evaluation tasks. Other FAILURE count levels could also trigger the transmission of notification messages.

b. Completion Performance

The flowcharts of FIGS. 9-13 show the additional functionality of a representative implementation of the newsgroup evaluation system 110 of one preferred embodiment of the present invention. It should also be noted that in some alternative implementations the functions noted in the various blocks may occur out of the order depicted in the flowcharts of FIGS. 9-13. For example, two blocks shown in succession in FIG. 9 may, in fact, be executed substantially concurrently. Alternatively, the blocks may sometimes be executed in the reverse order depending upon the functionality involved.

Figure 9:
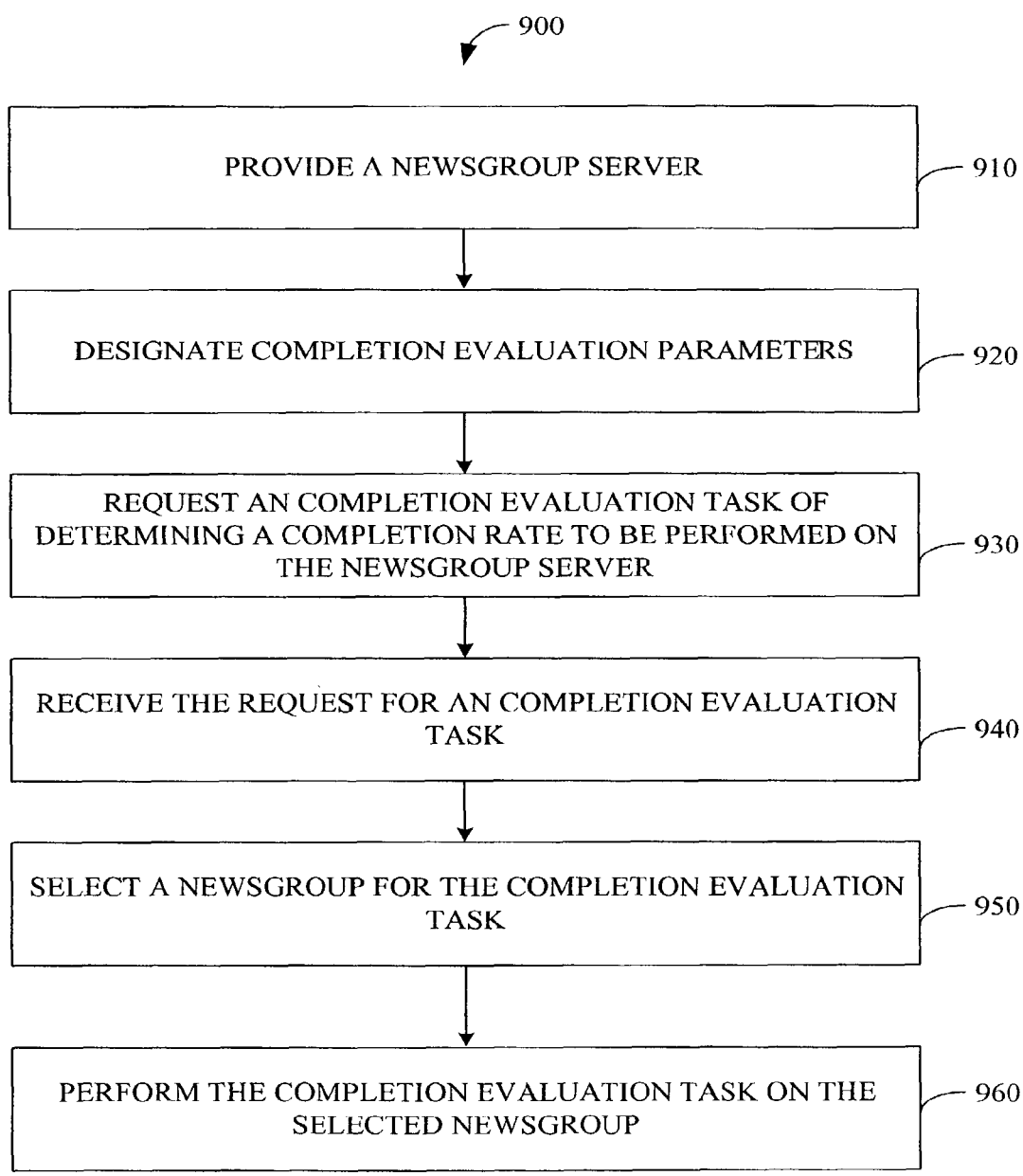
FIG. 9 is a flowchart describing the functionality of performing a completion evaluation task in a representative embodiment of the newsgroup evaluation system in FIG. 1.

As depicted in FIG. 9, the functionality of a representative embodiment of one preferred embodiment of the newsgroup evaluation system 110 or method 900 may be construed as beginning at block 910. In block 910, a newsgroup server 120 supplying newsgroup service is provided. In block 920, completion evaluation parameters for a completion evaluation task are designated. The completion evaluation task involves the determination of a completion rate for the newsgroup server 120. The completion rate is the percentage of all the parts of multipart articles that are present on the newsgroup server 120. Completion evaluation parameters are the criteria for determining this completion rate.

One of the criteria in the completion evaluation parameters is the minimum completion limit for a newsgroup. The completion limit is the minimum acceptable completion rate for a newsgroup. For example, a completion limit of 85% signifies that 85% of multipart articles in a newsgroup should have all their parts present. Additional completion evaluation parameters include the name of a newsgroup to be examined; and the minimum size limit of a newsgroup. These completion evaluation parameters will be discussed in more detail hereinafter.

In block 930, a request is generated to perform the completion evaluation task on the newsgroup server 120 by a network administrator, for example. The request may be made by a command from a user or administrator, such as a keystroke from a keyboard or a mouse input. In some embodiments of the invention, a user may schedule for requests of completion evaluation tasks to be generated. For example, a user may schedule a completion evaluation task to be performed at the same time every week, several times an hour, etc. Then on the scheduled time and day, a request will automatically be generated for performance of the completion evaluation task.

Once a request is received in block 940, a newsgroup is selected to be the subject of the completion evaluation task, as depicted in block 950. In the completion evaluation parameters, a particular newsgroup may be designated. Therefore, a known newsgroup that has numerous multipart postings may be desired to be the subject of the completion evaluation task. As depicted in block 960, the completion evaluation task is performed on the selected newsgroup by determining a completion rate for the newsgroup. An alternative newsgroup could also be designated in the completion evaluation parameters for performing a completion evaluation task if a completion evaluation task cannot be performed on the primary designated newsgroup.

Completion evaluation parameters may further include a newsgroup size limit to ensure that a newsgroup has a large number of postings before a completion evaluation task will be performed. For example, a newsgroup size limit may be set at 100 postings which is an average of 20 postings a day for a retention period of 5 days. If a newsgroup does not satisfy the newsgroup size limit, then the completion evaluation task would not be performed, since it might be felt that there are not enough articles in the newsgroup to obtain a sufficiently reliable completion rate.

Figure 10:
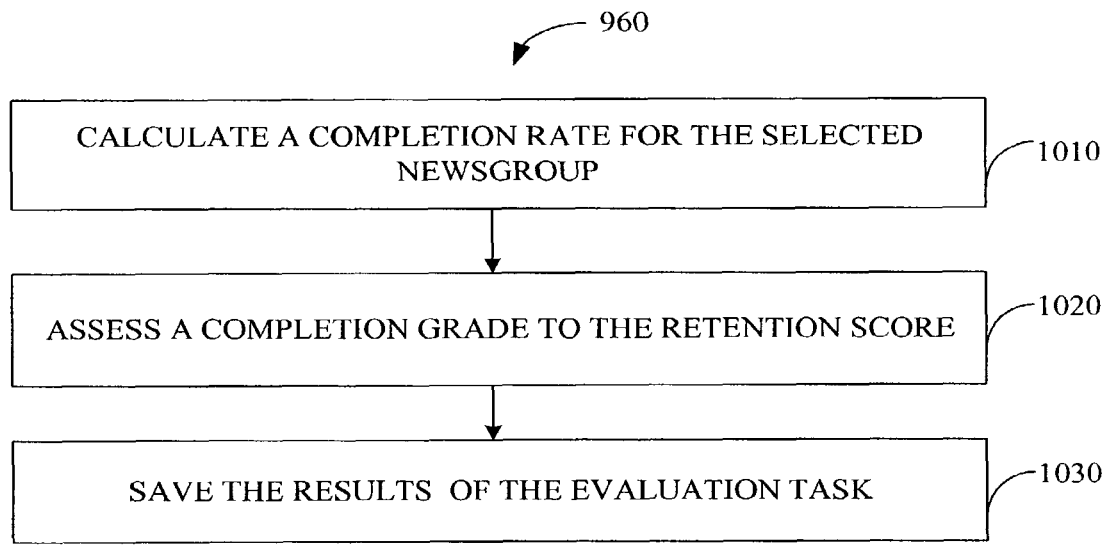
FIG. 10 is a flowchart describing the process of performing the completion evaluation task in FIG. 9.

Referring now to the flowchart of FIG. 10, the performance of the completion evaluation task 960 is described in greater detail for a representative implementation of one preferred embodiment of the invention. In block 1010, a completion rate is calculated for the selected newsgroup. One manner of determining the completion rate for a particular newsgroup is for the newsgroup evaluation system 110 to retrieve the list of the newsgroup's article headings, including the subject of each article. From each article's subject heading, the newsgroup evaluation system 110 can ascertain: (a) if the article is part of a multipart article; (b) the number of parts in the multipart article; and (c) the particular part number the article is, if the article is part of a multipart article. Therefore, the newsgroup evaluation system 110 can ascertain how many multipart articles are in the newsgroup and can also ascertain how many of these multipart articles have all of its smaller parts present in the newsgroup. A completion rate can then be calculated reflecting the percentage of multipart articles that are complete and can be successfully reassembled in the newsgroup.

After the completion rate is calculated, the completion rate is compared to the minimum completion limit and is assessed a completion grade, as shown in block 1020. The minimum completion limit is specified in the completion evaluation parameters. Once the completion rate for a newsgroup is calculated, the completion rate may be compared to the minimum completion limit for the newsgroup. If the completion rate is less than the minimum completion limit, then a completion grade of FAILURE is assessed to the completion rate. Otherwise, a completion grade of PASSING is assessed. In an earlier example, the minimum completion limit for a newsgroup was 85%. Therefore, if the completion rate for a newsgroup is calculated to be 60%, the completion rate is less than the minimum completion limit for that newsgroup. Accordingly, the completion rate is a FAILURE. In block 1030, the results of the completion evaluation task comparison are saved.

Figure 11:
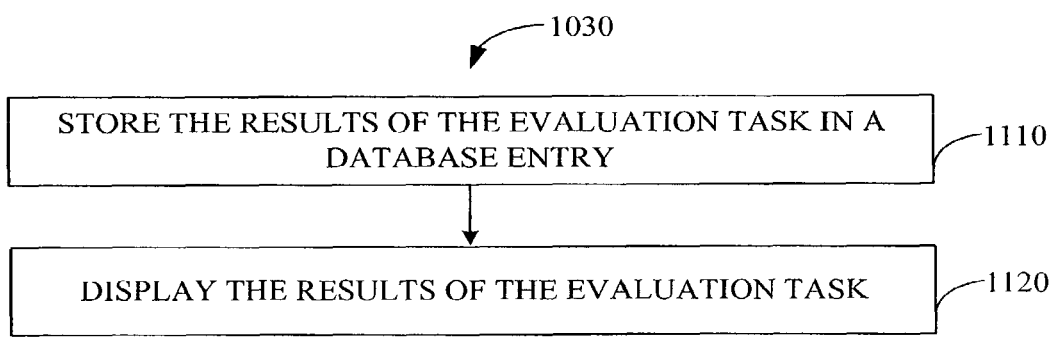
FIG. 11 is a flowchart describing the process of saving the results of the completion evaluation task in FIG. 10.

Referring now to the flowchart of FIG. 11, the saving of the results from the completion evaluation task 1030 is described in greater detail for a representative implementation of one preferred embodiment of the invention. In block 1110, the completion rate and grade for the newsgroup is stored on a storage medium such as a hard drive of a computer. In one embodiment of the present invention, the completion rate and the completion grade are logged as an entry in a record-keeping database located on the hard drive of the computer. In addition to the completion rate, other information, such as the name of the newsgroup that was the subject of the completion evaluation task, and the date and time the completion rate was determined, can also be stored. In block 1120, the results of the completion evaluation task are displayed to a user of the newsgroup evaluation system.

Figure 12:
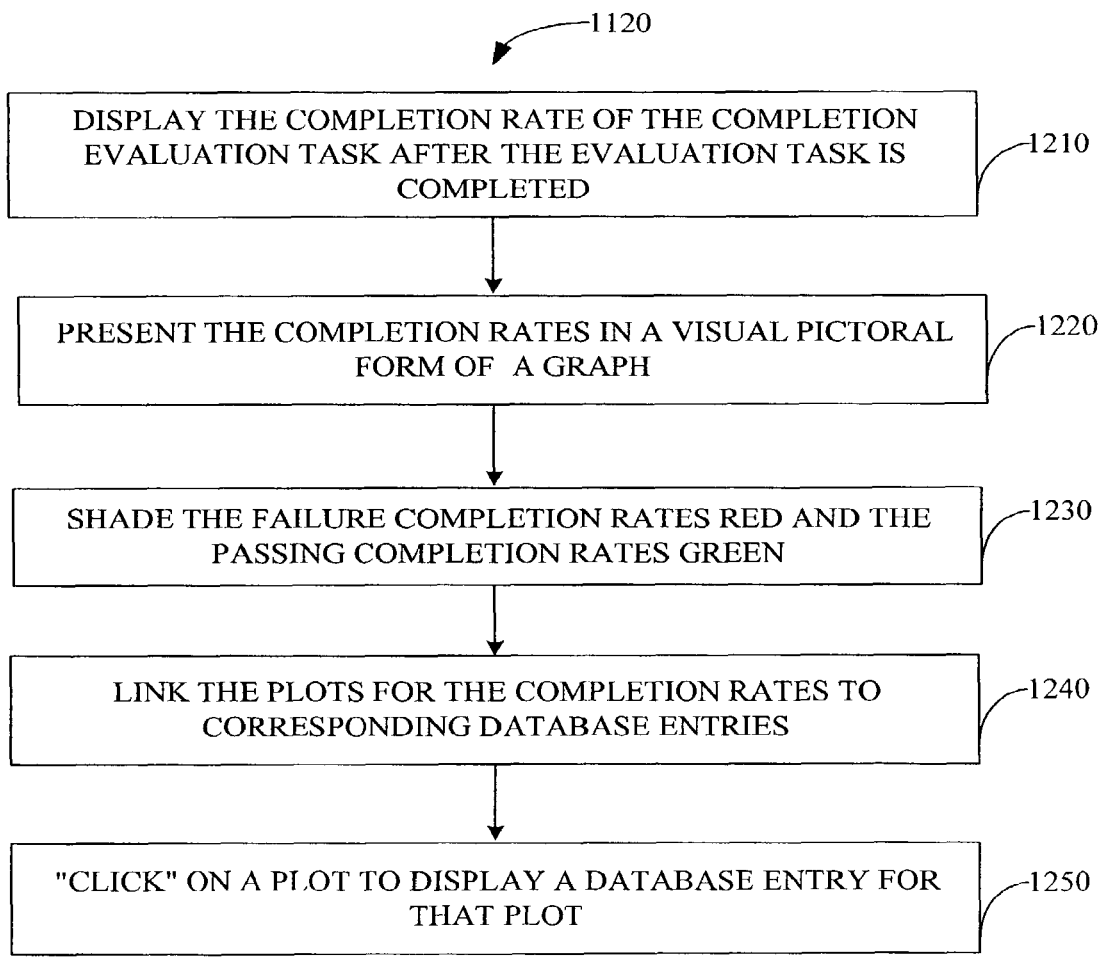
FIG. 12 is a flowchart describing the process of displaying the results of the completion evaluation task in FIG. 11.

Referring now to the flowchart of FIG. 12, the displaying of the results from the completion evaluation task 1120 is described in greater detail for a representative implementation of one preferred embodiment of the invention. In block 1210, the completion rate of the completion evaluation task and the completion grade are displayed to the user after the completion evaluation task is completed. Depending upon the intent of the user, the completion rate and grade may be displayed with other relevant information such as the date and time the completion evaluation task was completed. Prior results from completion evaluation tasks may also be retrieved by a user since earlier completion rates and grades are stored in a storage medium.

The completion rates may be presented to a user in a visual pictorial form, such as a graph, table, or chart. In FIG. 12, block 1220 depicts the completion rate being plotted on a graph. The graph may also represent the completion grade for the corresponding completion rate. As depicted in block 1230, a plot of a completion rate that was a FAILURE may be shaded in one color, e.g. yellow, while a plot of a complete rate that was PASSING may be shaded in another color, e.g. blue. Further in block 1240, the plots of the completion rates on the graph may be linked to the corresponding database entry for that completion rate, so that a user may click on the plot on the graph for a completion rate and have the entry for that particular completion rate from the database be retrieved and displayed to the user, as depicted in block 1250. It is contemplated that a user of the newsgroup evaluation system 110 can configure outputs to conform to the user's needs and preferences.

Figure 13:
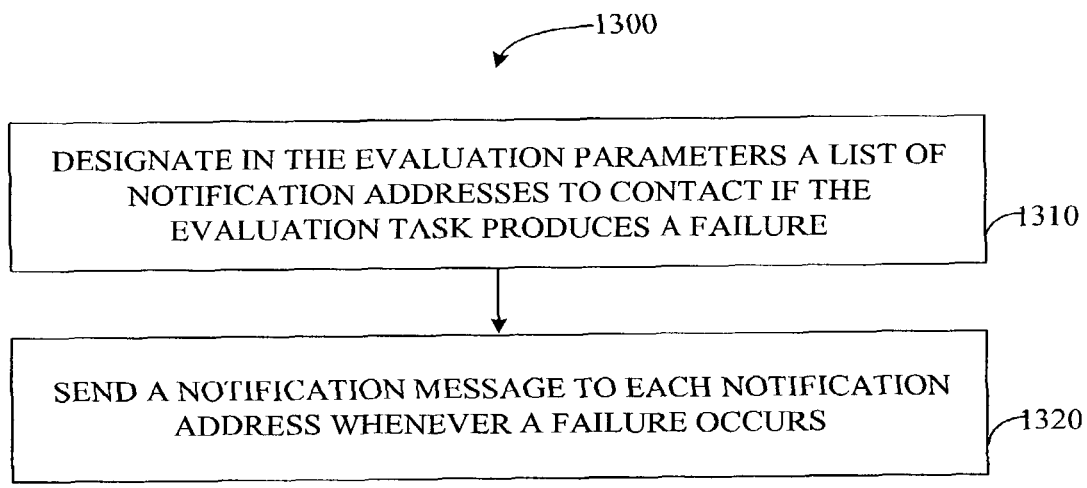
FIG. 13 is a flowchart describing the process of sending notification messages for the completion evaluation task according to one preferred embodiment of the present invention.

For example, for a completion rate that receives a completion grade of FAILURE, a representative implementation of one preferred embodiment of the present invention sends a notification message to designated recipients, as shown by the flowchart of FIG. 13. In block 1310, the completion evaluation parameters include a list of notification addresses that notification messages are sent to, whenever a FAILURE occurs. The notification list can include an address for one person, multiple addresses for one person, or addresses for more than one person. Typically, the notification address is an email address that can be used to send an email message over the Internet to a person's computer or through wireless communications to a person's wireless communication device, such as, among others, a cell phone or interactive pager. In alternative embodiments, however, the notification address could be an address for other messaging technologies such as, among others, instant messaging.

When a completion rate is lower than the minimum completion limit for that newsgroup, a notification message is sent to the notification addresses in the notification list, as shown in block 1320. This is known as a FAILURE result. The notification message informs the recipient that the newsgroup service is not performing at a desired standard. The content of the message contains relevant information about the failed completion evaluation task such as the name of the newsgroup, the completion rate, and the date and time that the completion evaluation task took place. In alternative implementations of the invention, different FAILURE count levels (e.g. 5 FAILURES out of 100 completion evaluation tasks, 10 FAILURES in a one month period, etc.) may be tracked to trigger the transmission of notification messages. Accordingly, an ISP can then gauge the quality of newsgroup service being provided by its newsgroup service provider and request compensation from the newsgroup service provider if the service is not satisfactory.

c. Retention Performance

The flowcharts of FIGS. 14-18 show the functionality of a representative implementation of the newsgroup evaluation system 110 of one preferred embodiment of the present invention. It should also be noted that in some alternative implementations the functions noted in the various blocks may occur out of the order depicted in the flowcharts of FIGS. 14-18. For example, two blocks shown in succession in FIG. 14 may, in fact, be executed substantially concurrently. Alternatively, the blocks may sometimes be executed in the reverse order depending upon the functionality involved.

Figure 14:
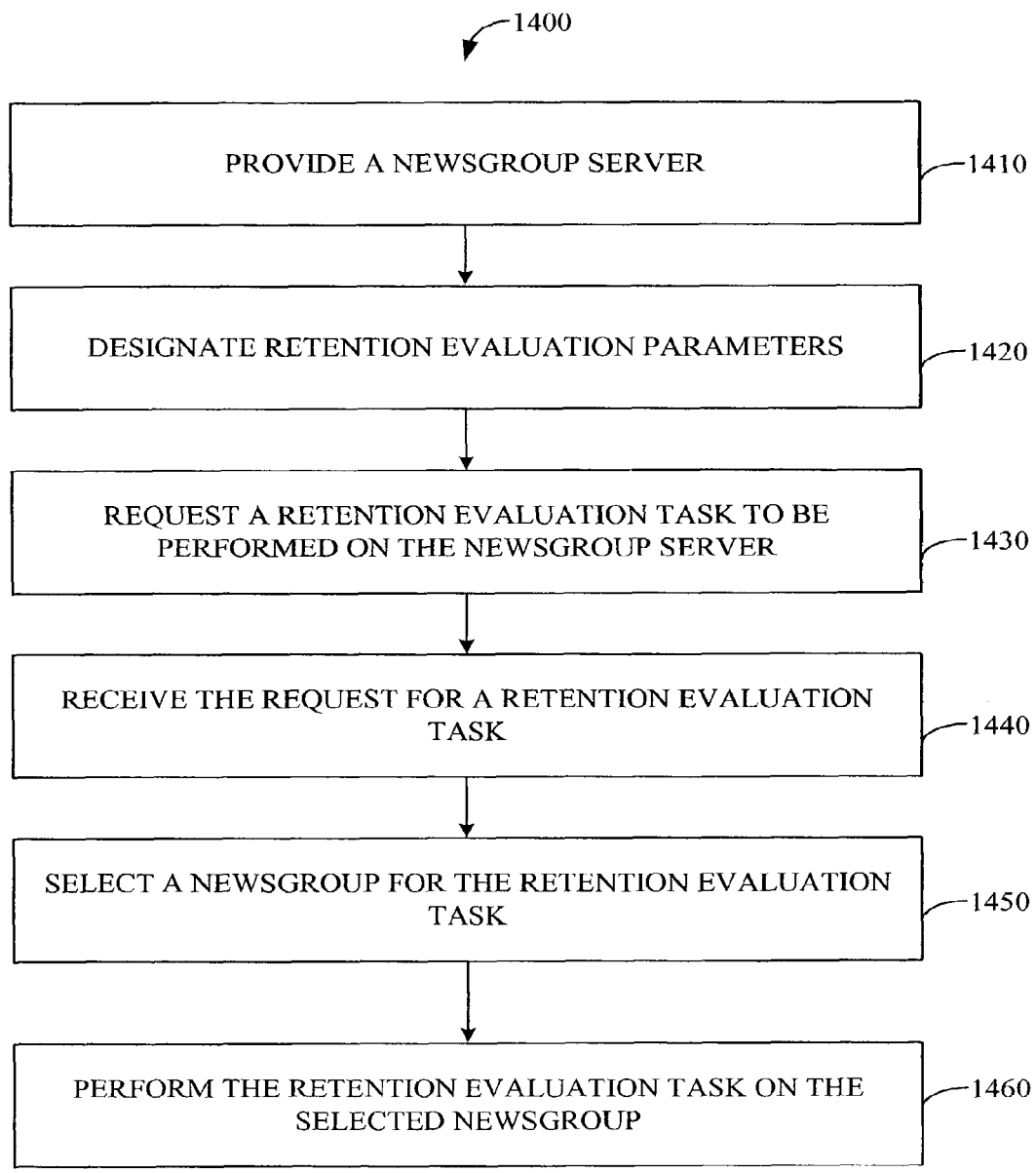
FIG. 14 is a flowchart describing the functionality of performing a retention evaluation task in the newsgroup evaluation system in FIG. 1.

As depicted in FIG. 14, the functionality of one preferred embodiment of the newsgroup evaluation system 110 or method 1400 may be construed as beginning at block 1410. In block 1410, a newsgroup server 120 supplying newsgroup service is provided. In block 1420, retention evaluation parameters for a retention evaluation task are designated. The retention evaluation task involves the determination of a retention score for the newsgroup server 120. The retention score is the amount of time that a newsgroup article is stored on the newsgroup server 120. Retention evaluation parameters include the criteria for determining this retention score.

One of the criteria in the retention evaluation parameters is the minimum retention limit for a newsgroup. For example, a standard newsgroup that has text postings may have a minimum retention limit of 30 days, whereas a newsgroup that has binary postings may have a minimum retention limit of 5 days. Additional retention evaluation parameters include the names of newsgroups to be examined and the minimum size limit of a newsgroup. These retention evaluation parameters will be discussed in more detail hereinafter.

In block 1430, a request is generated to perform the retention evaluation task on the newsgroup server 120. The request may be made by a command from a user such as a keystroke from a keyboard or a mouse input. In some embodiments of the invention, a user may schedule for requests of retention evaluation tasks to be generated. For example, a user may schedule a retention evaluation task to be performed at the same time every week, multiple times an hour, etc. Then on the scheduled time and day, a request will automatically be generated for performance of the retention evaluation task.

Once a request is received in block 1440, a newsgroup is selected to be the subject of the retention evaluation task, as depicted in block 1450. In the retention evaluation parameters, a particular newsgroup may be designated. Therefore, a known newsgroup that has numerous postings may be desired to be the subject of the retention evaluation task. Also, more than one newsgroup may be specified in the retention evaluation parameters so that a retention score may be determined for more than one newsgroup in a single request. For instance, a newsgroup focusing on text messages could be tested and a newsgroup focusing on binary messages could be tested, since binary and text messages usually have different retention periods.

As depicted in block 1460, the retention evaluation task is performed on the selected newsgroup by determining a retention score for the newsgroup. An alternative newsgroup could also be designated in the retention evaluation parameters for performing a retention evaluation task if a retention evaluation task cannot be performed on a primary designated newsgroup. Retention evaluation parameters may further include a newsgroup size limit to ensure that a newsgroup has a large number of postings before a retention evaluation task will be performed. For example, a newsgroup size limit may be set at 600 postings which is an average of 20 postings a day for a retention period of 30 days. If a newsgroup does not satisfy the newsgroup size limit, then the retention evaluation task would not be performed, since it might be felt that there are not enough articles in the newsgroup to obtain a sufficiently reliable retention score.

Figure 15:
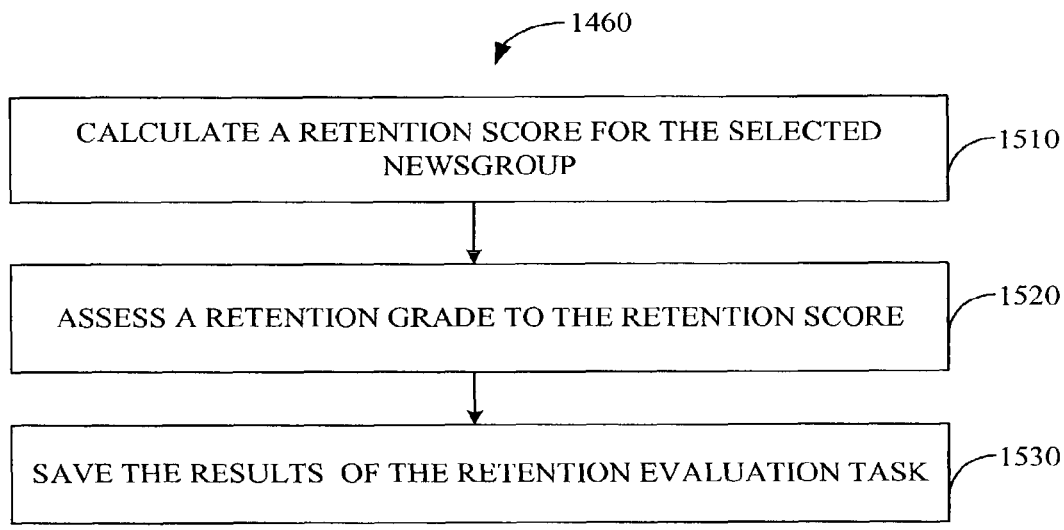
FIG. 15 is a flowchart describing the process of performing the retention evaluation task in FIG. 14.

Referring now to the flowchart of FIG. 15, the performance of the retention evaluation task 1460 is described in greater detail for a representative implementation of one preferred embodiment of the invention. In block 1510, a retention score is calculated for the selected newsgroup. One manner of determining the retention score for a particular newsgroup is to ascertain the date of the oldest posted article stored on the newsgroup server 120 for the newsgroup and to also ascertain the date of the newest posted article stored for the newsgroup. Then, the retention score is calculated by determining the number of days that occurs between the two dates. For instance, if the oldest article in a newsgroup was posted on April 5 and the newest posting was on April 8, then the retention score for that newsgroup is 3 days. To ascertain dates of the articles, it is not necessary for the body of articles to be downloaded. The newsgroup evaluation system 110 can ask the newsgroup server 120 for a list of the group's message headings which includes the date each message was posted.

After the retention score is calculated, the retention score is compared to the retention limit for that newsgroup and is assessed a retention grade, as shown in block 1520. The retention limit is specified in the retention evaluation parameters. Further, there may be multiple retention limits contained in the retention evaluation parameters, such as a retention limit for text newsgroups and a retention limit for binary newsgroups. For example, once the retention score for a binary newsgroup is calculated, the retention score may be compared to the retention limit for binary newsgroups. If the retention score is less than the retention limit, then a retention grade of FAILURE is assessed to the retention score. Otherwise, a retention grade of PASSING is assessed. In an earlier example, the retention limit for binary newsgroup was 5 days. Therefore, if the retention score is 3 days, the retention score is less than the retention limit for that newsgroup. Accordingly, the retention score is a FAILURE. In block 1530, the results of the retention evaluation task comparison are saved.

Figure 16:
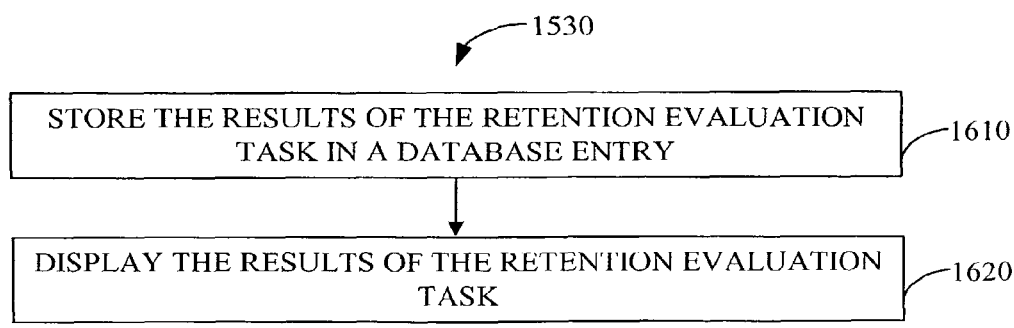
FIG. 16 is a flowchart describing the process of saving the results of the retention evaluation task in FIG. 15.

Referring now to the flowchart of FIG. 16, the saving of the results from the retention evaluation task 1530 is described in greater detail for a representative implementation of one preferred embodiment of the invention. In block 1610, the retention score and retention grade for the newsgroup is stored on a storage medium such as a hard drive of a computer. In one preferred embodiment, the retention score and the retention grade are logged as an entry in a record-keeping database located on the hard drive of the computer. In addition to the retention score, other information, such as the name of the newsgroup that was the subject of the retention evaluation task, and the date and time the retention score was determined, can also be stored. In block 1620, the results of the retention evaluation task are displayed to a user of the newsgroup evaluation system.

Figure 17:
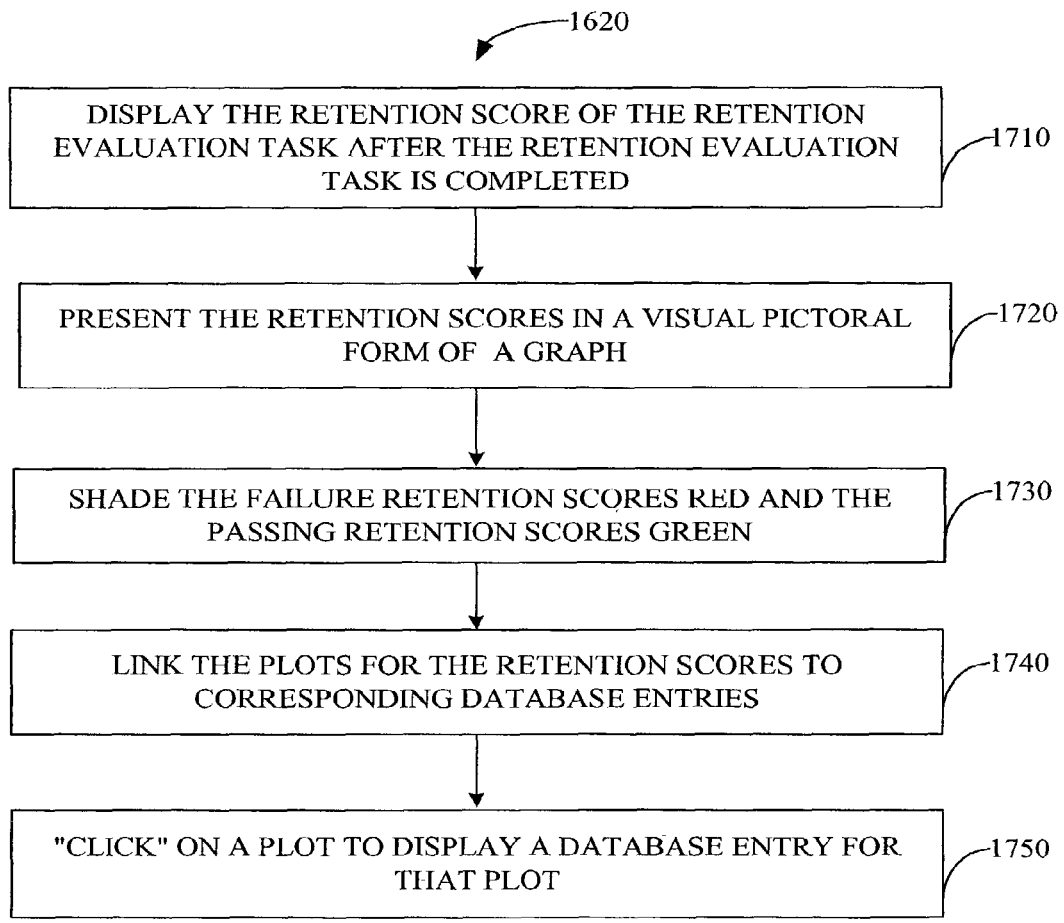
FIG. 17 is a flowchart describing the process of displaying the results of the retention evaluation task in FIG. 16.

Referring now to the flowchart of FIG. 17, the displaying of the results from the retention evaluation task 1620 is described in greater detail for a representative implementation of the invention. In block 1710, the retention score of the retention evaluation task and the retention grade are displayed to the user after the retention evaluation task is completed. Depending upon the intent of the user, the retention score and grade may be displayed with other relevant information such as the date and time the retention evaluation task was completed. A user may also retrieve prior results from retention evaluation tasks, since earlier scores and grades are stored in a storage medium.

The retention scores may be presented to a user in a visual pictorial form, such as a graph, table, or chart. In FIG. 17, block 1720 depicts the retention score being plotted on a graph. The graph may also represent the retention grade for the corresponding retention score. As depicted in block 1730, a plot of a retention score that was a FAILURE may be shaded one color, e.g. purple, while a plot of a retention score that was PASSING may be shaded in another color, e.g. orange. Further in block 1740, the plots of the retention scores on the graph may be linked to the corresponding database entry for that retention score, so that a user may click on the plot on the graph for a retention score and have the entry for that particular retention score from the database be retrieved and displayed to the user, as depicted in block 1750. It is contemplated that a user of the newsgroup evaluation system 110 can configure outputs to conform to the user's needs and preferences.

Figure 18:
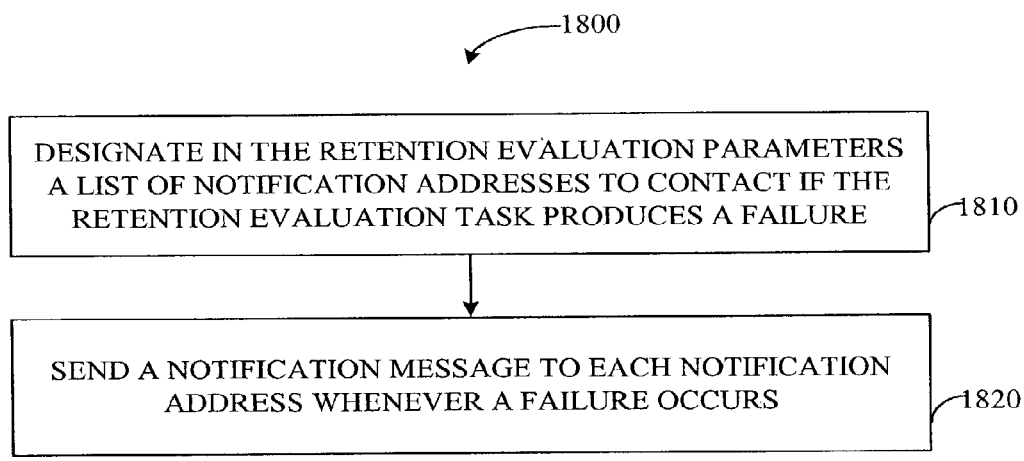
FIG. 18 is a flowchart describing the process of sending notification messages for the retention evaluation task according to one preferred embodiment of the present invention.

For example, for a retention score that receives a retention grade of FAILURE, a representative implementation of one preferred embodiment of the present invention sends a notification message to designated recipients, as shown by the flowchart of FIG. 18. In block 1810, the retention evaluation parameters include a list of notification addresses that notification messages are sent to, whenever a FAILURE occurs. The notification list can include an address for one person, multiple addresses for one person, or addresses for more than one person. Typically, the notification address is an email address that can be used to send an email message over the Internet to a person's computer or through wireless communications to a person's wireless communication device, such as, among others, a cell phone or interactive pager. In alternative embodiments, however, the notification address could be an address for other messaging technologies such as instant messaging, for example.

When a retention score is lower than the retention limit for that newsgroup, a notification message is sent to the notification addresses in the notification list, as shown in block 1820. This is known as a FAILURE result. The notification message informs the recipient that the newsgroup service is not performing at a desired standard. The content of the message contains relevant information about the failed retention evaluation task such as the name of the newsgroup, the retention score, and the date and time that the retention evaluation task took place. In alternative implementations of the invention, different FAILURE count levels (e.g. 5 FAILURES out of 100 retention evaluation tasks, 10 FAILURES in a one month period, etc.) may be tracked to trigger the transmission of notification messages. Accordingly, an ISP can then gauge the quality of newsgroup service being provided by its newsgroup service provider and request compensation from the newsgroup service provider if the service is not satisfactory.

Advantageously, the above-described embodiments of the present invention, assess the delivery performance, completion performance, and retention performance of a newsgroup service. It should be emphasized that the above-described embodiments of the present invention are merely possible examples of implementations, merely set forth for a clear understanding of the principles of the invention. Many variations and modifications may be made to the above-described embodiment(s) of the invention without departing substantially from the principles of the invention. For example, the network evaluation system could send notification messages in the form of voice messages to listed telephone numbers in the evaluation parameters in addition to the delivery mechanisms mentioned. Further, the network evaluation system can be configured to not perform any evaluation tasks if the system observes the newsgroup network or the ISP network to be inoperable. All such modifications and variations are intended to be included herein within the scope of this disclosure and the present invention and protected by the following claims.

What is claimed is:

1. A method, comprising:
   selecting, via a processor, a newsgroup for analysis in a retention evaluation of a service provided by a newsgroup server hosting the newsgroup, the selecting of the newsgroup based on a size threshold, the retention evaluation to be performed by the processor by:
      calculating, via the processor, a retention score for the service by determining an amount of time between an oldest post available via the newsgroup and a newest post available via the newsgroup;
      comparing, via the processor, the retention score to a retention threshold, wherein the retention threshold is a predetermined amount of time set via the processor; and
      assessing, via the processor, a retention grade based on the comparison; and
   generating, via the processor, a quality report for the service provided by the newsgroup server based on the retention grade.

2. A method as defined in claim 1, wherein the assessing of the retention grade comprises assigning a failing grade when the retention score is less than the retention threshold.

3. A method as defined in claim 1, wherein the assessing of the retention grade comprises assigning a passing grade when the retention score is equal to or greater than the retention threshold.

4. A method as defined in claim 1, further comprising conveying a notification to a designated recipient when the quality report indicates that the service provided by the newsgroup server is unsatisfactory.

5. A method as defined in claim 1, further comprising repeating the selecting, the calculating, the comparing and the assessing with other newsgroups hosted by the same newsgroup server, and wherein the generating of the quality report includes determining a frequency at which the retention grade for the newsgroup and the other newsgroups is a failing grade, and further including conveying a notification to a designated recipient when the frequency exceeds a quality threshold.

6. A method as defined in claim 1, wherein the amount of time between the oldest post and the newest post is a number of days.

7. A method as defined in claim 1, wherein the selecting of the newsgroup based on the size threshold includes determining whether a size of the newsgroup is greater than the size threshold before performing the retention evaluation of the service provided by the newsgroup server.

8. An apparatus, comprising:
   memory including machine readable instructions: and
   a processor to execute the instructions to perform operations including:
      selecting a newsgroup for analysis in a retention evaluation of a service provided by a newsgroup server hosting the newsgroup, the selecting of the newsgroup based on a size threshold, the retention evaluation to be performed by the processor by:
         calculating a retention score for the service by determining an amount of time between an oldest post available via the newsgroup and a most recent post available via the newsgroup;
         comparing the retention score to a retention threshold, the retention threshold being a predetermined amount of time set via the processor; and
         assessing a retention grade based on the comparison; and
      generating a quality report for the service provided by the newsgroup server based on the retention grade.

9. An apparatus as defined in claim 8, wherein the assessing of the retention grade comprises assigning a failing grade when the retention score is less than the retention threshold.

10. An apparatus as defined in claim 8, wherein the assessing of the retention grade comprises assigning a passing grade when the retention score is equal to or greater than the retention threshold.

11. An apparatus as defined in claim 8, wherein the operations further comprise conveying a notification to a designated recipient when the quality report indicates that the service provided by the newsgroup server is unsatisfactory.

12. An apparatus as defined in claim 8, wherein the operations further comprise repeating the selecting, the calculating, the comparing and the assessing with other newsgroups hosted by the newsgroup server, and generating of the quality report includes determining a frequency at which the retention grade for the newsgroup and the other newsgroups is a failing grade, and the operations further include conveying a notification to a designated recipient when the frequency exceeds a quality threshold.

13. An apparatus as defined in claim 8, wherein the amount of time between the oldest post and the newest post comprises a number of days.

14. An apparatus as defined in claim 8, wherein the selecting of the newsgroup based on the size threshold includes determining whether a size of the newsgroup is greater than the size threshold before performing the retention evaluation of the service provided by the newsgroup server.

15. A tangible machine readable storage device including instructions which, when executed, cause a machine to perform operations comprising:
    selecting a newsgroup for analysis in a retention evaluation of a service provided by a newsgroup server hosting the newsgroup, the selecting of the newsgroup based on a size threshold, the retention evaluation to be performed by the machine by:
        calculating retention score by determining an amount of time between an oldest post available via the newsgroup and a newest post available via the newsgroup;
        comparing the retention score to a retention threshold, the retention evaluation being a predetermined amount of time set via the machine; and
        assessing a retention grade based on the comparison; and
    generating a quality report for the service provided by the newsgroup server based on the retention grade.

16. A storage device as defined in claim 15, wherein the assessing of the retention grade comprises assigning a failing grade when the retention score is less than the retention threshold.

17. A storage device as defined in claim 15, wherein the assessing of the retention grade comprises assigning a passing grade when the retention score is equal to or greater than the retention threshold.

18. A storage device as defined in claim 15, wherein the operations further comprise conveying a notification to a designated recipient when the quality report indicates that the service provided by the newsgroup server is unsatisfactory.

19. A storage device as defined in claim 15, wherein the operations further comprise repeating the selecting, the calculating, the comparing and the assessing for other newsgroups hosted by the same newsgroup server, and generating of the quality report includes determining a frequency at which the retention grade is a failing grade, and the operations further include conveying a notification to a designated recipient when the frequency exceeds a quality threshold.

20. A storage device as defined in claim 15, wherein the selecting of the newsgroup based on the size threshold includes determining whether a size of the newsgroup is greater than the size threshold before performing the retention evaluation of the service provided by the newsgroup server.

* * * * *